United States Patent
Franklin et al.

(10) Patent No.: US 6,263,436 B1
(45) Date of Patent: *Jul. 17, 2001

(54) METHOD AND APPARATUS FOR SIMULTANEOUS ELECTRONIC EXCHANGE USING A SEMI-TRUSTED THIRD PARTY

(75) Inventors: Matthew Keith Franklin, New York, NY (US); Michael Kendrick Reiter, Raritan, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/768,380

(22) Filed: Dec. 17, 1996

(51) Int. Cl.$^7$ .................................................. H04L 9/00
(52) U.S. Cl. ............................................ 713/167; 713/168
(58) Field of Search .............................. 380/23, 24, 25, 380/30, 49, 21; 395/186, 187.01; 235/379; 705/75, 80, 69; 713/176, 170, 171, 169, 168, 167

(56) References Cited

U.S. PATENT DOCUMENTS

| 5,553,145 | 9/1996 | Micali | 380/30 |
| 5,615,269 | * 3/1997 | Micali | 380/49 |

FOREIGN PATENT DOCUMENTS

WO 96/29667   9/1996   (WO) .

OTHER PUBLICATIONS

J. Zhou et al.: A Fair Non–Repudiation Protocol, Proceedings of the 1996 IEEE Symposium on Security and Privacy, Oakland, CA, May 6–8, 1996, pp. 55–61.

Author(s): Markus Jakobsson. "Ripping Coins for a Fair Exchange," *Advances in Cryptology*—Eurocrypt '95 (lecture notes in computer sicne 921), pp. 220–230, 1995.

Author(s): M. Blum, "How to Exchange Secret Keys," ACM Transections on Computer Systems, vol. 1, No. 2, May, 1983, pp. 175–193.

Author(s): S. Ketchpal, "Transaction Protection for Information Buyers and Sellers," Proceedings of the Dartmouth Institute for Advanced Graduate Studies '95, 1995.

Author(s): Michael Luby, Silvio Micali, and Charles Rockoff. "How to Simultaneously Exchange a Secret Bit by Flipping a Symmetrically–Biased Coin", IEEE, 1983.

* cited by examiner

*Primary Examiner*—Gail Hayes
*Assistant Examiner*—James Seal
(74) *Attorney, Agent, or Firm*—Kenyon & Kenyon

(57) ABSTRACT

A method and apparatus for fairly exchanging documents. A first document is shared between principal Y and third party Z. A second document is shared between principal X and third party Z. Z verifies that the sharing of the first and second documents has been performed correctly without Z understanding either document. If verified, Z sends its shares of the first and second documents to Y and X, respectively. X and Y verify that Z's shares are authentic.

14 Claims, 6 Drawing Sheets

METHOD AND APPARATUS FOR SIMULTANEOUS ELECTRONIC EXCHANGE USING A SEMI-TRUSTED THIRD PARTY

BACKGROUND OF THE INVENTION

The invention relates generally to electronic commerce and transactions. More particularly, the invention relates to techniques for enabling users to engage in fair or simultaneous electronic transactions using a semi-trusted third party, and in the case of fraudulent behavior by a user, prevent the disclosure of any electronic information until the exchange, and authentication of information is complete.

Recently there has been a proliferation of information networks such as computer, telephone, cable, energy and others. The presence of these networks has tremendously improved the efficiency and convenience of many transactions (i.e., exchanges) while lowering associated costs. Yet more recently, digital signatures and public-key encryption have added much needed security to these electronic transactions. This functionality makes electronic communication channels articularly suitable for financial transactions, i.e., electronic commerce.

A problem endemic to electronic transactions is the need for simultaneity. The term "simultaneity" as used herein means an electronic transaction that is structured to guarantee certain actions will take place if and only if certain other actions take place. In the case of payment protocols, simultaneity can ensure that a customer receives a document from a vendor if and only if the vendor receives payment from the customer. Similarly, simultaneity can ensure that a certified electronic mail is delivered to its destination if and only if proof of that delivery is given to its sender.

The absence of simultaneity in electronic transactions severely limits electronic commerce. This can be illustrated using certified electronic mail as an example. A certified mail transaction typically includes a sender, e.g., Tracey, who wishes to deliver a given message to an intended recipient, e.g., Alex. Tracey could try to get a receipt from Alex of an electronic message m by sending m to Alex in clear text form, i.e., unencrypted. If message m was something as important as Tracey's electronic signature for an electronic payment, a dishonest Alex might be motivated to discontinue the conversation once he receives m. Alex could therefore deprive Tracey of any proof of delivery. Conversely, Alex may find unacceptable the idea of sending a blank receipt to Tracey prior to receiving m.

The simultaneity problem does not disappear by simply adding a few more rounds of communication. For example, it is possible for Tracey to send Alex an encryption of m, for which Alex would return his digital signature of this ciphertext as an "intermediate" receipt. Tracey would then send him the decryption key, for which Alex would send a final receipt.

This transaction does not guarantee simultaneity as well. It simply adds one more layer of complexity which merely delays the point where Alex may engage in dishonest behavior. Alex may refuse to send Tracey any receipt after receiving Tracey's decryption key. Alex's signature of the encrypted message would not constitute a valid receipt since there is no proof that Tracey sent Alex her key.

Various cryptographic approaches exist in the literature that attempt to solve similar problems, but they are not satisfactory in many respects. Some of these methods applicable to multi-party scenarios propose use of verifiable secret sharing, or multi-party protocols for making simultaneous some specific transactions between parties. These methods, however, require a plurality of parties. Furthermore, a majority of these party members must be honest. This greatly increases the complexity of the transaction. Furthermore, these methods require several rounds of transmission, which greatly increases overhead. Thus, these techniques are generally impractical. Moreover, these techniques are incapable of ensuring simultaneity for two party transactions.

Sophisticated cryptographic transactions between two parties have been developed. These cryptographic transactions, however, do not guarantee simultaneity. As illustrated with our certified electronic mail example, these techniques merely delay the point at which dishonest behavior can occur.

There have been several specific attempts made at providing simultaneity for two-party transactions. These attempts, however, use assumptions or methods that are unsatisfactory in various ways. For example, an article by M. Blum titled "How to exchange (secret) keys," *ACM Transactions on Computer Systems,* vol. 1, No. 2, May 1983, pp. 175–193, describes transactions that include contract signing and certified mail. These techniques, however, are very complex and require a large number of rounds of communication.

The method of Luby et al. given in a paper titled "How to simultaneously exchange a secret bit by flipping a symmetrically-biased coin," 1983, allows two parties to exchange the decryption of two given ciphertexts in a special way. Both parties leak information to each other such that the probability that one party will guess correctly the clear text of the other is slowly increased towards 100%. This method, however, does not guarantee simultaneity since one party could quit the protocol with a slight advantage.

The most recent attempts for achieving simultaneity for two party transactions involve the use of one or more external entities. These external entities are often referred to as "centers", "servers" or "trustees." Examples of the use of external entities to achieve fair exchange is outlined in a paper by S. Ketchpal titled "Transaction protection for information buyers and sellers," *Proceedings of the Dartmouth Institute for Advanced Graduate Studies '95,* 1995. These external entities are referred to as "fully-trusted" third parties since they are assumed to be honest. The techniques using fully-trusted third parties, however, quickly break down in the presence of dishonest behavior in the case of human third parties, or equipment malfunction or tampering in the case of electronic third parties. Moreover, these techniques are incapable of determining whether the third party is operating in the proper manner.

SUMMARY OF THE INVENTION

In view of the foregoing, there exists a substantial need in the art for simultaneous electronic transactions (SET), otherwise known as "fair exchange." More particularly, there exists a substantial need in the art for a "fair exchange protocol" which allows two parties to exchange electronic content if and only if certain actions take place, thereby preventing either party, or a third party, to gain an advantage by quitting prematurely or otherwise engaging in fraudulent activity.

The invention permits two principal parties ("principals") to fairly exchange electronic information or content ("documents") through a semi-trusted third party over information networks such as computer, telephone, cable, energy and others ("networks"). A semi-trusted third party is distinguished from a fully-trusted third party in that either principal may detect when the semi-trusted third party misbehaves on its own, but not if it conspires with a principal.

The invention gives both principals the ability to control transmission of their document to the other principal. The invention also allows each principal and the third party to determine whether there is any faulty, dishonest or incorrect behavior, e.g., the wrong document is being sent or the requested document is being withheld. In addition, the invention prevents both principals from gaining access to any portion of the other's document unless each have received and authenticated the other's complete document. The third party never gains access to either document under any circumstances.

The invention accomplishes this using an apparatus and method for simultaneously exchanging a first document held by a first principal for a second document held by a second principal through a semi-trusted third party over a network. The invention provides a one-way hash of the first document to the second principal and semi-trusted third party, and a one-way hash of the second document to the first principal and semi-trusted third party. The invention splits the first document into section A and section B, and the second document into section C and section D. The invention exchanges section A for section C, and provides sections B and D to the third party. Both principals produce a checksum for the section they receive, and sends the checksums to the third party. The third party uses the checksums to authenticate that sections A and B actually comprise the first document, and that sections C and D actually comprise the second document. If the first and second documents match the checksums, the third party gives section B to the second principal and section D to the first principal. Once the first principal receives section D, and the second principal section B, they both use their checksums to ensure that the documents are the same documents originally requested.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 2.B is a block flow diagram for a fair exchange protocol in accordance with an embodiment of the present invention.

FIG. 4.B is a second block flow diagram for a fair anonymous on-line purchase protocol in accordance with an embodiment of the present invention.

DETAILED DESCRIPTION

Figure 1:
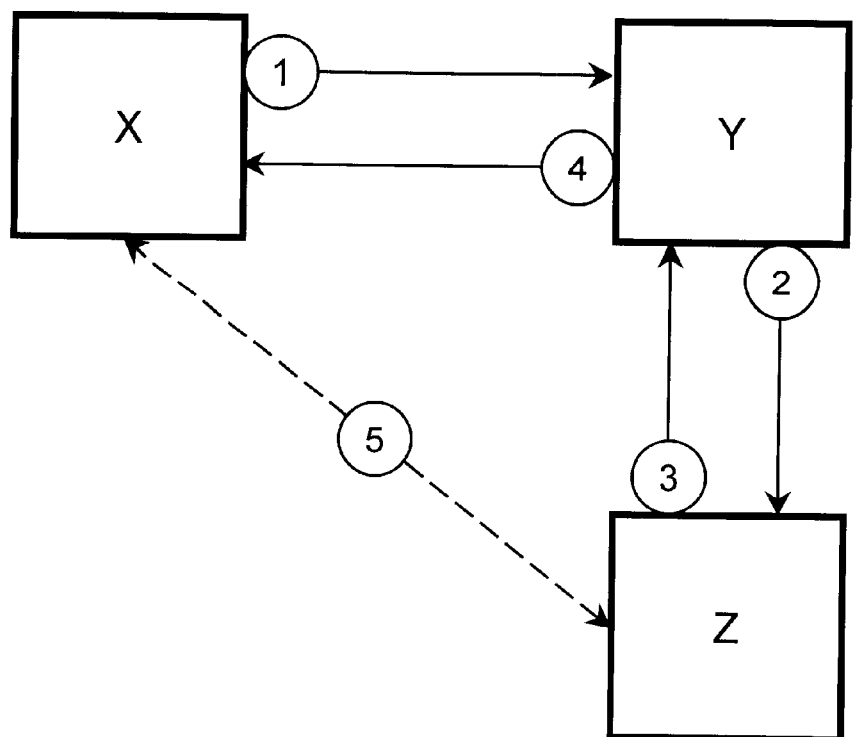
FIG. 1 is a block flow diagram showing the information flow of an embodiment of the present invention.

The invention provides various schemes for ensuring simultaneity in electronic transactions. In each of the schemes described below, there is a principal party X, a principal party Y, and a semi-trusted third party Z. The schemes show a transaction where X and Y desire to simultaneously exchange documents using the semi-trusted third party Z. The scheme, however, can apply to any exchange of electronic information such as electronic payment protocols, contract signing, certified mail and so forth.

The invention ensures simultaneity in electronic transactions by providing the following functionality. The invention gives both principals the ability to control transmission of their document to the other principal. The invention also allows each principal and the third party to determine whether there is any dishonest or incorrect behavior. In the event of dishonest behavior, the invention prevents both principals from gaining access to any portion of either document unless both principals have each received the other's complete document and confirmed that it is indeed the requested document. The third party never has access to either document.

The invention uses both private key encryption algorithms such as Data Encryption Standard (DES), and public key encryption algorithms such as RSA. Any conventional public or private key encryption algorithms fall within the scope of the invention, and are interchangeable. It is assumed that any encryption algorithm used is deterministic and uniquely decodable. In an advantageous embodiment of the invention a private key encryption algorithm is used to encrypt the documents D with some key K, and a public key encryption algorithm is used to encrypt K. Thus to decode D, a principal need only decrypt K. Therefore, the exchange between principals will involve encrypted keys K.

To describe the various apparatus and methods of the present invention, it is assumed that there are two principals and a third party. It should be clear, however, that each of these may be any entity, such as a person, a person's representative, a physical device (in particular, a tamper-proof device) or a collection of people and/or physical devices. For example, the third party could be located in a device or facility belonging to either principal.

Furthermore, the invention is not limited to two-party transactions. The invention is demonstrated using a 2-out-of-2 secret sharing scheme (as discussed below), but may just as well use n-out-of-n secret sharing, and t-out-of-n sharing. For example, this can be used to solve variations of fair exchange by distributing the role of one or more of the parties. Other generalizations can address exchanges among multiple document holders.

Since the invention uses a semi-trusted third party, and not a fully-trusted third party, the third party could be a random member of the network. This would be very appealing for protocols on large public networks. Furthermore, this would add one more layer of security to the transaction since misbehavior by the randomly chosen third party is unprofitable and detectable. It is even possible to reduce the chance of misbehavior by incorporating financial rewards for good behavior.

The basic SET or fair exchange is now described. At least one transmission (preferably all) in the method below is electronic. The term "electronic" means any non-physical delivery, including, without limitation, transmissions via telephones, computer networks, radio, broadcasting, air waves, lightwaves and the like. Further, it can be appreciated by one skilled in the art that any schemes, steps or algorithms described herein with reference to an embodiment of the invention can be implemented in either hardware or software. If implemented in software, these schemes, steps or algorithms can be implemented on any general purpose computer, such as a personal computer, or special purpose computer, such as a digital signal processor (DSP), having at a minimum a processor with sufficient processing speed, and a computer readable medium such as read-only memory (ROM), programmable ROM (PROM), erasable programmable ROM (EPROM), random access memory (RAM), hard drive, optical drive, floppy disk, and so forth.

Fair Exchange Protocol

According to the invention, it is desired to devise practical simultaneous electronic transaction methods involving semi-trusted third parties.

FIG. 1 shows a block flow diagram of one embodiment of the invention. This embodiment takes four flows in the case of no disruptions: (1) from the first principal X to the second principal Y; (2) from Y to the semi-trusted third party Z; (3) from Z back to Y; and (4) from Y to X. The first principal does not interact with the third party unless unfair activity is detected (see Flow 5 in FIG. 1). In fact, the identity of the first principal remains hidden from the third party under ordinary circumstances.

A unique function of the invention is that each principal and the third party can authenticate whether the requested document has been sent. Each principal possesses an encryption of the document it has requested and a one-way hash of the key. The third party possesses a one-way hash of both keys as well. A protocol is considered authenticated if the exchanged keys are consistent with the known hash values.

In this embodiment of the invention, both principals actually hold encrypted documents D1 and D2, and exchange these documents sometime prior to completion of the transaction. In alternative embodiments, however, it is possible for one or both documents to be held in a public database. Take for example a publicly accessible database of tuples of the form $<desc_i, enc_i, f(K_i), \delta_i>$. Here $desc_i$ is a short description of the contents of a data file (e.g., the title of a movie); $enc_i$ is an encryption under a secret key $K_i$ of the data file (e.g., digital copy of a movie); $f(K_i)$ is a one-way hash of $K_i$; and $\delta_i$ is an independent authority's signature on the preceding information, which serves as the authority's appraisal that the decryption of $enc_i$ using $K_i$ will indeed produce $desc_i$. Under this scenario, any documents in the database can be fairly exchanged.

For an advantageous embodiment of the invention, assume the following. A private key encryption algorithm such as DES is used to encrypt the base documents D1 and D2 with some key K, and a public key encryption algorithm is used to encrypt K. The first principal X holds base document D1 and a secret key Kx, and principal Y holds base document D2 and a secret key Ky. Principal X wants base document D2 and principal Y wants base document D1. Therefore, both parties have agreed to exchange encrypted base documents D1 and D2 at some time prior to completion of the transaction. When both base documents are exchanged is unimportant to the invention, as long as it is prior to completing the transaction. The SET consists of exchanging the secret key documents Kx and Ky, which are necessary to decrypt base documents D1 and D2, respectively. It is worthy to note that the basic SET algorithm works whether the base documents are split or the key documents are split. In this embodiment of the invention, any reference to splitting documents refers to splitting key documents, i.e., secret keys Kx and Ky.

Assume that all three parties know a one-way function f on the keyspace, and that principal X knows f(Ky) and principal Y knows f(Kx). Also assume that the third party Z has a private key known only to itself, and that X knows the corresponding public key. The encryption of m with Z's public key is denoted by Ez(m), and the decryption of m with Z's private key is denoted by Dz(m). A function h described below is assumed to be any cryptographically strong hash function that is known to both principals and the third party. A function F is also known to all three parties and is a checksum for authenticating the key documents to be exchanged.

Thus, as an initial state, the following information is known by each party:

|  | Principal X | Principal Y | Third Party |
| --- | --- | --- | --- |
| Secret Key | Kx | Ky | Kz |
| Public Key | Z |  |  |
| One-way function | f | f | f |
| One-way function output | f(Ky) | f(Kx) |  |
| Checksum function | F | F | F |
| One-way hash | h | h | h |

Essentially, the fair exchange protocol works by sharing Kx between Y and Z using a 2-out-of-2 secret sharing scheme, and similarly sharing Ky between X and Z. A 2-out-of-2 secret sharing scheme is a means of splitting data into two pieces so that the data can be reconstructed from the two pieces together, but either piece alone yields no information about the data.

The properties of f described below enable Z to verify that this sharing has been performed correctly, without revealing Kx or Ky to Z. If verified, Z sends its shares of Kx and Ky to Y and X, respectively. If unverified, the transaction stops. If Z misbehaves and sends only one of its shares of Kx and Ky to the appropriate party, then X and Y will detect this, and X and Y will work together to complete the exchange. If Y receives Kx and misbehaves by sending the wrong share to X, or completely stopping the transaction, X can request the information needed to complete Ky from Z.

More particularly, the invention accomplishes this logically by using an apparatus and method for simultaneously exchanging a first key document held by a first principal for a second key document held by a second principal through a semi-trusted third party over a network. The invention splits Kx into section A and section B, and Ky into section C and section D. The invention exchanges section A for section C, and provides sections B and D to Z. Both X and Y produce a checksum for received sections C and A, respectively, and sends the checksums to Z. Third party Z uses the checksums to authenticate that sections A and B actually comprise Kx, and that sections C and D actually comprise Ky. If Kx and Ky match the checksums, Z gives section B to Y and section D to X. Once X receives section D, and Y section B, they both use their checksums to ensure that Kx and Ky are the proper keys to the base documents originally requested.

If Z determines that Kx and Ky do not match the checksums, Z informs X and Y and stops the transaction. If X or Y determines that Z is dishonest, X and Y may work together to complete the transaction or begin again with a new third party. If X or Y determines that the other is dishonest, either can work with Z to complete the transaction, or stop the transaction entirely. In any of the above cases, neither party alone can determine Kx or Ky without completing the transaction.

Figure 2A:
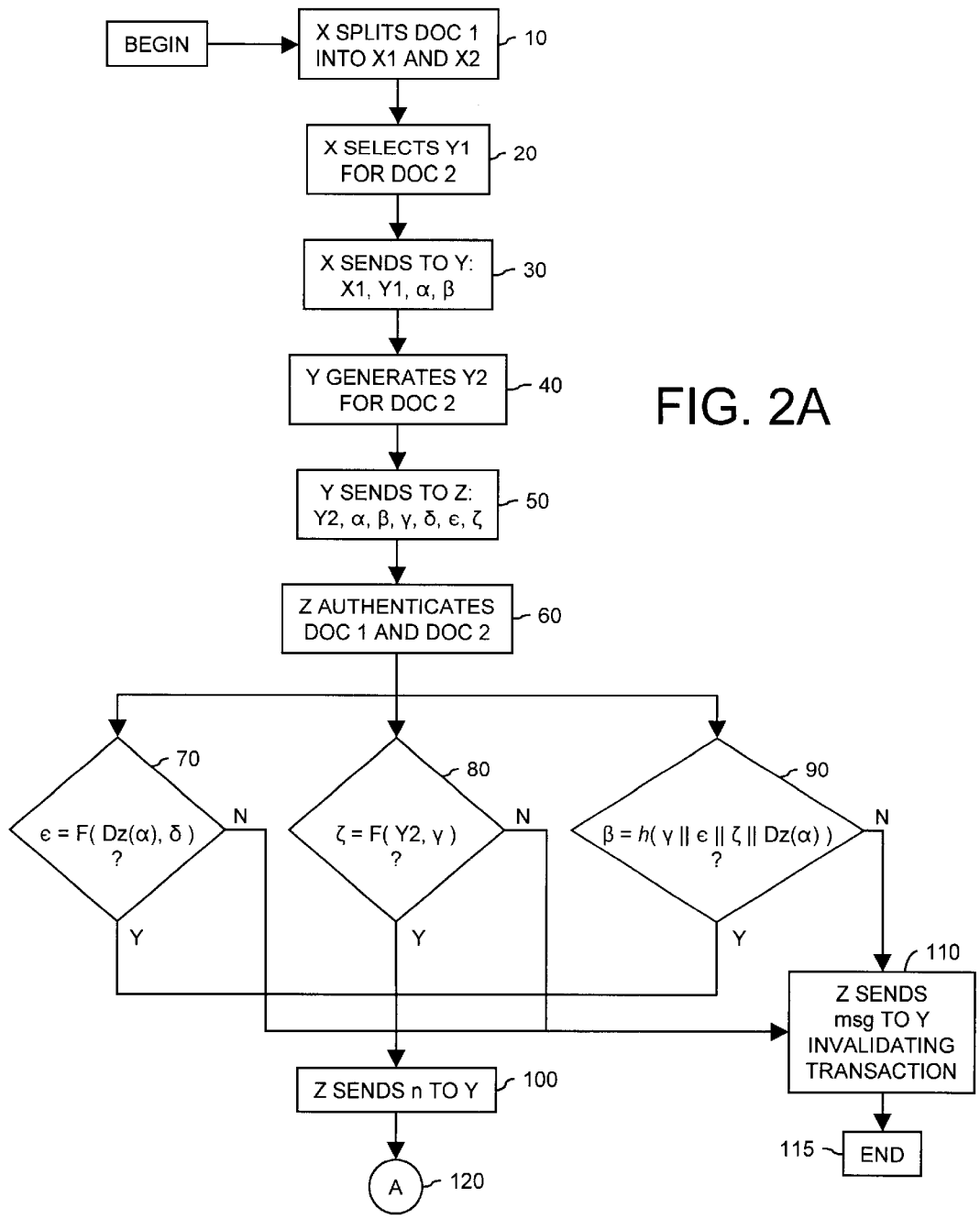
FIG. 2.A is a block flow diagram for a fair exchange protocol in accordance with an embodiment of the present invention.
Figure 2B:
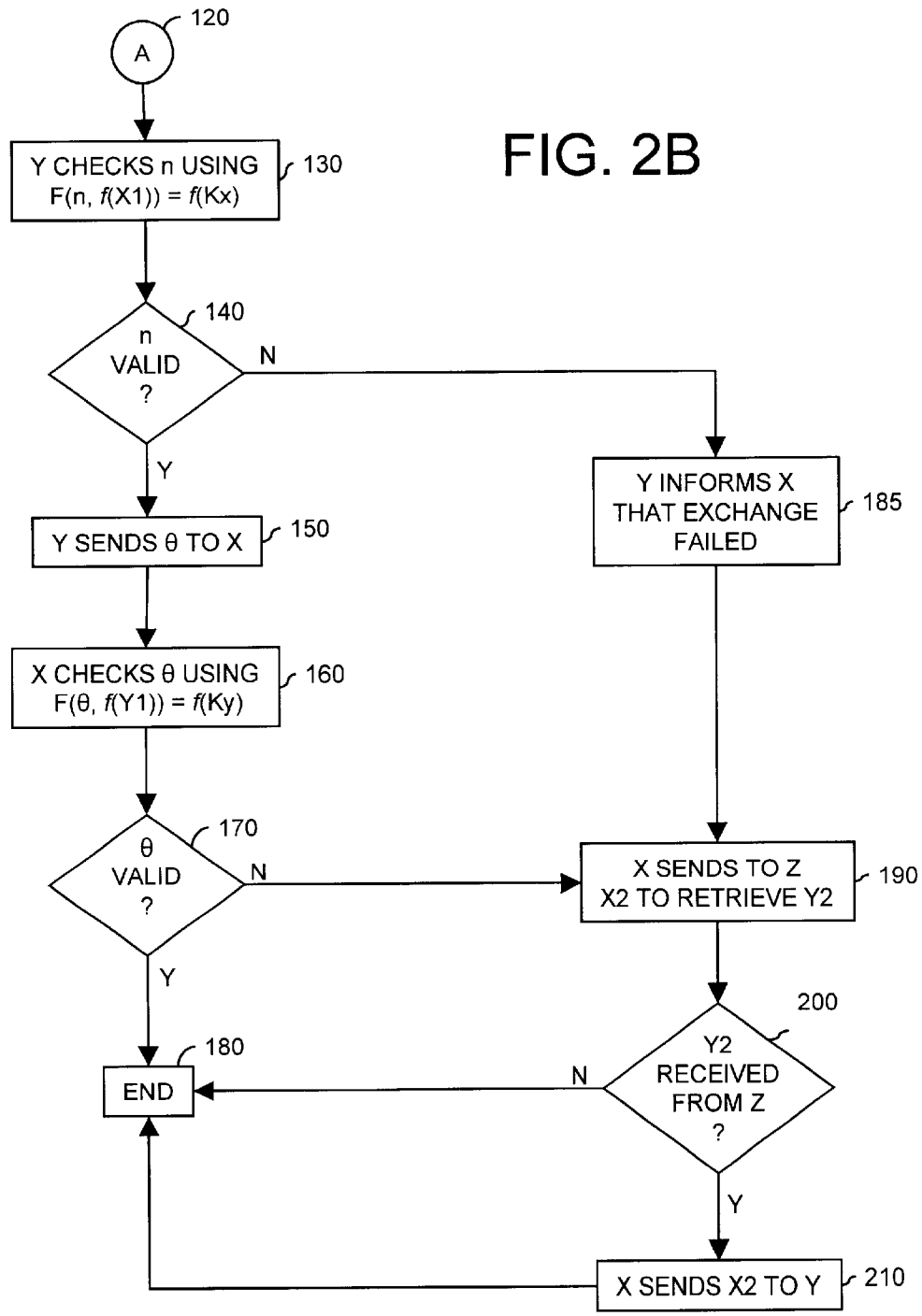

FIG. 2.A is a block flow diagram of the steps used in an embodiment of the present invention. The following describes in further detail the fair exchange protocol.

Step 1:

As shown in step 10, Principal X chooses X1 at random from the domain of f. Principal X computes:

$$X2=KxX1^{-1}$$

with X2 representing section B. Principal X also chooses Y1 at random from the domain of f at step 20. At step 30, principal X sends the following information to Y,

X→Y: X1, Y1, α, β where X1 represents section A, Y1 represents section C, α represents Ez(X2) which is the encryption of X2 using Z's public key, and β represents h(f(Y1)∥f(Kx)∥f(Ky)∥X2), where h is a cryptographically strong hash function.

Step 2

When Y receives <X1, Y1, α, β>, Y calculates, $$Y2=KyY1^{-1}$$

at step 40, and sends to Z at step 50 the following,

Y→Z: Y2, α, β, γ, δ, ε, ς where Y2 represents section D, where γ represents f(Y1), where δ represents f(X1), where ε represents f(Kx), and where ς represents f(Ky).

Step 3

When Z receives <Y2, α, β, γ, δ, ε, ς>, Z authenticates at step 60 the following:

Equation 1

At step 70, Z authenticates

ε=F(Dz(α), δ)

where F represents a checksum function for producing a checksum using Dz(α) and δ, and where Dz(α) represents the decryption of α using Z's private key.

Equation 2

At step 80, Z authenticates

ς=F(Y2, γ)

where F represents a checksum function for producing a checksum using Y2 and γ.

Equation 3

At step 90, Z authenticates

β=h(γ∥ε∥ς∥Dz(α))

where h represents any cryptographically strong hash function.

If all three equations prove to be valid, Z accepts the exchange, and sends a value n to Y at step 100, and the process continues via step 120 (represented by the letter A as shown in FIGS. 2.A and 2.B) to step 130. If Z is honest, n should equal Dz(α). If Z does not accept, Z sends a message to Y reporting that it rejected the transaction at step 110, and ends the transaction at step 115.

Step 4

Once Y receives n, it calculates its own checksum at step 130 using:

F(n, f(X1))=f(Kx)

If valid at step 140, Y sends a value θ to X at step 150. If Y is honest, θ should equal Y2. If invalid, Y informs X that the exchange failed at step 185. X sends X2 to Z in an attempt to retrieve Y2 at step 190. If X receives Y2 from Z at step 200, X sends X2 to Y at step 210 and ends the transaction at step 180. If Y2 is not received at step 200, X ends the transaction at step 180.

Step 5

Once X receives θ, it calculates its own checksum at step 160 using:

F(θ, f(Y1))=f(Ky)

If the checksum is valid at step 170, X terminates the protocol at step 180. If invalid, it sends X2 to Z in an effort to retrieve Y2 at step 190. By sending X2, X is representing to Z that it has honestly performed the exchange, and should receive Y2. If X receives Y2 from Z at step 200, X sends X2 to Y at step 210 and ends the transaction at step 180. If Y2 is not received at step 200, X ends the transaction at step 180.

Fair Exchange Protocol Example

The fair exchange protocol described above can be illustrated using the following example. Assume Kx and Ky are integers such that 0<Kx<N and 0<Ky<N. For simplicity, small numbers (<40) will be used. In our example, assume Kx=17 and Ky=11. Further assume that f represents the function $f(V)=V^2 \bmod 35$, where V is any integer 0<V<N, and F represents the checksum function $F(A)=(B^2*C) \bmod 35$.

Step 1

At step 1, Kx is split into two pieces X1 and X2 such that:

Kx=(X1*X2) mod 35.

Thus X1 and X2 can be any number of combinations, as long as when multiplied together and divided by 35 the remainder is 17. In our example, assume that X1=4 and X2=13. It can be see that:

Kx=(4*13) mod 35
=52 mod 35
=17

Kx is run through f to produce f(Kx). In our example, $f(Kx)=Kx^2 \bmod 35$
$=17^2 \bmod 35$
=9

During step 1, X determines how Y will split Ky by selecting Y1 such that 0<Y1 < the maximum number allowed by f, which in this case is 35. In this example, X selects Y1=23. It is assumed that X also knows f(Ky) initially, which in our example is $f(Ky)=Ky^2 \bmod 35$
$=11^2 \bmod 35$
=16

Principal X sends to Y the following,

X→Y:X1, Y1, Ez(X2), h(f(Y1)∥f(Kx)∥f(Ky)∥X2)

which in our example is,

X→Y:4, 23, Ez(13), h(4, 9, 16, 13).

It is worthy of note that X1 and Y1 are sent to Y as clear text, while X2 is encrypted.

Step 2

The secret key for principal Y in our example is Ky=11. When Y receives X's transmission, it calculates Y2 using $Y2=KyY1^{-1}$. Solving for Y2, which in this example is 23, we find that Y2=2. As a check, we see that Ky=(Y1*Y2)mod 35.
=(2*23)mod 35
=46 mod 35
=11

Principal Y sends to Z the following.

Y→Z: Y2, α, β, γ, δ, ε, ς or rather,

Y→Z: Y2, Ez(13), h(4, 9, 16, 13), f(Y1), f(X1), f(Kx), f(Ky)

which in our example is,

Y→Z: 2, Ez(13), h(4, 9, 16, 13), 4, 16, 9, 16.

Step 3

When Z receives Y2, α, β, γ, δ, ε, ς, it uses three equations to authenticate the key documents, all of which must prove to be valid for Z to complete the transaction.

Equation 1

ε=F(Dz(α), δ)

where F is in our example the checksum function $F(A)=(B^2*C) \mod 35$, and $Dz((\alpha))=Dz(Ez(X2))$, thus by substitution we get:

$\epsilon=(Dz(\alpha)^2*\delta) \mod 35$
$=(13^2*16) \mod 35$
$=(169*16) \mod 35$
$=2704 \mod 35$
$=9$ Therefore, since $\epsilon=f(Kx)=9$, and $F(Dz(\alpha), \delta)=9$, this equation is valid.

Equation 2

For equation 2, $$\varsigma=F(Y2, \gamma)$$

which gives:

$\varsigma=(Y2^2*f(Y1)) \mod 35$
$=(2^2*4) \mod 35$
$=16 \mod 35$
$=16$

Therefore, since $\varsigma=f(Ky)=16$, and $F(Y2,\gamma)=16$, this equation is valid.

Equation 3

For equation 3, $$\beta=h(\gamma\|\epsilon\|\varsigma\|Dz(\alpha))$$

where h is any cryptographically strong hash function.

In our example, we will assume:
$h(f(Y1)\|f(Kx)\|f(Ky)\|X2)=$
$h(f(Y1)\|f(Kx)\|f(Ky)\|Dz(\alpha))$.

Since in this embodiment of the invention there is no direct contact between X and Z, thus hiding the identity of X from Z, this equation permits Z to check that Y has passed on the information from X honestly.

Since in our example all three equations are valid, Z accepts the exchange and sends to Y, Z→Y: n which if Z is honest should be, Z→Y: $Dz(\alpha)$ which is,

Z→Y: 13 and subsequently will give Y2 to anyone that can present $Dz(\alpha)$. If Z would not have accepted, Z would send a message to Y reporting that it rejected the transaction. If Z sends the wrong n, Y will catch it when it performs its own checksum, thus detecting when Z is dishonest or otherwise acting improperly. In such an event, Y will pass a message to X informing X of Z's improper behavior. X will send X2 to Z in an attempt to retrieve Y2. If X receives Y2 from Z, X will pass X2 to Y thus completing the transaction. If X is unsuccessful, both parties can cancel the transaction and try again using a different Z.

Step 4

Once Y receives n, it calculates its own checksum using:

$F(n, f(X1))=f(Kx)$
$F(Dz(\alpha), f(X1))=f(Kx)$
$(13^2*16) \mod 35=9$
$2704 \mod 35=9$
$9=9$ Since n is valid, Y sends θ to X. If Y is honest, θ should equal Y2. If invalid, Y informs X that the exchange failed. In our example, Y sends X:

Y→X: 2

If Y sends the wrong θ to X, X will catch it when x performs its own checksum, thus detecting when Y is dishonest or otherwise acting improperly.

Step 5

Once X receives θ, it calculates its own checksum using:

$F(\theta, f(Y1))=f(Ky)$

In our example, θ=Y2=2, which gives:

$(2^2*4) \mod 35=16$
$16 \mod 35=16$
$16=16$

Since θ is valid, X terminates the protocol. If θ were invalid, X would send X2=13 to Z in an effort to retrieve Y2. By sending X2, X is representing to Z that it has honestly performed the exchange, and should receive Y2. If Z fails to send YZ, X can contact Y and cancel the transaction, and possibly start over with a different Z.

Detecting Dishonest Behavior

At the end of a SET or fair exchange, the following will be true:

1. If all three parties are honest, then X learns Ky and Y learns Kx,
2. If X and Z are honest, then Y learns nothing useful about Kx unless X learns Ky, and disruption by Y will be detected.
3. If Y and Z are honest, then X learns nothing useful about Ky unless Y learns Kx, and disruption by X will be detected.
4. If X and Y are honest, then Z learns nothing useful about Kx or Ky, X learns Ky if and only if Y learns Kx, and disruption by Z will be detected.

Thus, the invention provides a mechanism by which all three parties are capable of detecting dishonest behavior by another party. This is discussed in more detail in the following paragraphs.

Misbehavior of Third Party Z

No matter how Z misbehaves, Z cannot learn useful information about Kx or Ky, since it does not see shares X1 or Y1. If Z sends a wrong value n in Step 3, then Y will detect a problem in Step 4, and pass a failure message on to X. At this point, Y may not be able to distinguish between misbehavior by Z and misbehavior by X, and X may have a similar confusion. X clears up its confusion by trying to retrieve Y2 from Z, and sending X2 to Y if successful. Otherwise, X and Y could agree to run the exchange protocol with a different Z.

Misbehavior of Principal Y

Similarly, no matter how Y misbehaves, Y learns Kx only if Z sends X2 in Step 3. Third party Z does this only if the three tests in Step 3 succeed and thus only if Z holds the missing share Y2 that is needed by the party (presumably X) that computed $h(f(Y1)\|f(Kx)\|f(Ky)\|X2)$. This party will be able to present X2 to Z to retrieve Y2 and reconstruct Ky. If the party that computed $h(f(Y1)\|f(Kx)\|f(Ky)\|X2)$ is Y itself, and Z accepts, then Y knew both Kx and Ky beforehand.

Misbehavior of Principal X

No matter how X misbehaves, X learns Ky only if it receives Y2 from Y or Z. This will happen only if Z's tests in Step 3 succeed. If these tests succeed, then Z sends X2 to Y in Step 3, and this will be the missing share of the value Kx that Y wanted.

One Way Function

The one-way function used in our protocols should be of the form $f: G \rightarrow G$ where G is a group in which testing membership, computing the group operation and inverse, and sampling with a nearly uniform distribution are efficient. Moreover, f should have the additional property that there exists an efficiently computable function F: G×G→G such that $F(X_0, f(y))=f(xy)$. A few examples of proposed one-way functions with this property are listed below, although any conventional one-way function falls within the scope of the invention.

First One-Way Function Example

Assume that $G=Z^2_N$ where N is a product of two large distinct primes, and that f is defined by $f(x)=x^2$ mod N. Then $F(x,y)=x^2y$ mod N has the property that $F(x,f(y))=f(xy)$. F is one-way under the assumption that N is hard to factor.

Second One-Way Function Example

Assume that $G=Z^2_p$ where p is a prime such that p−1 has a large prime factor q, and that f is defined by $f(x)=g^x$ mod p where g has order q in $Z^2_p$. Then $F(x,y)=y^x$ mod p has the property that $F(x,f(y))=f(xy)$. Function f is one-way under the assumption that it is difficult to compute discrete logarithms with respect to Third One-Way Function Example Consider the group G of bijective functions x: $\{1, \ldots, n\} \rightarrow \{1, \ldots, n\}$ (i.e., the group of all permutations of $\{1, \ldots, n\}$) with a group operation of composition (i.e., xy=x ○ y). Fix a set $E \subset \{1, \ldots, n\} \times \{1, \ldots, n\}$, and for any group member x, let $x(E)=\{<x(i), x(j)>: <i,j> \in E\}$ and $f(x)=x(E)$. Then, $F(x,y)=x(y(E))=\{<x(y(i)), x(y(j))>: <i,j> \in E\}$ has the property that $F(x,f(y))=f(xy)$. Function f is one-way under the assumption that $<\{1, \ldots, n\}, E>$ is a "hard graph," i.e., that it is computationally infeasible to determine an isomorphism between it and a random isomorphic copy of it.

One-Way Function From Any Group Action

More generally, it is possible to construct a one-way function f of the necessary form from any (not necessarily certified) one-way group action. The first and third constructions above are reasonably efficient; e.g., the former, with a 768-bit N, is only roughly one order of magnitude slower than the Secure Hash Algorithm, based on tests performed with the Cryptolib cryptographic library. The construction based on discrete logarithms with a 768-bit p, however, is another two orders of magnitude slower still, i.e., roughly 1000 times slower than SHA.

Collision-Free One-Way Function

In some cases it is convenient to make an additional assumption that f is collision-free, as it is in the construction based on the difficulty of computing discrete logarithms. For the construction based on the difficulty of factoring, only trivial collisions of the form $\{x, -x\}$ can be found efficiently, but these can be easily detected and overcome in our usage. The construction based on the graph isomorphism problem may not be collision-free, as a collision could be constructed from an automorphism of $<\{1, \ldots, n\}, E>$, i.e., a nontrivial permutation x such that $x(E)=E$.

Fair by "Kindness of Strangers"

As previously mentioned, variation of the fair exchange protocol is for Z to be chosen by X at random, e.g., as a hash of some of the elements of the first message from X to Y (e.g., all except Ez(X2) which is dependent on Z). This gives a fast fair exchange between X and Y unless X or Y can collude with a random party on the network. If Z is unavailable, or uncooperative, then X and Y will discover this and can repeat the protocol. By including a nonce or a time stamp in the hash, it is very likely that a different Z will be chosen for each repetition on a large network.

It is even possible to reward the third party when the exchange is successful. One method is for X and Y to each send a "tip" to Z after a successful exchange. This solution guarantees Z one or two coins when at most one of X and Y misbehave. More elaborate methods can guarantee Z a tip of constant amount if and only if the exchange is successful, and whether or not one of the parties misbehaves. For example, X can "rip" an off-line coin into two pieces, encrypt one of them using Z's public key, and then send both pieces (one encrypted, one not) to Y. Y will pass on to Z only the encrypted piece. Z verifies that it got a good half of a coin (else she rejects the exchange). Then either X or Y or both will send the other piece to Z at the end of a successful exchange. Other solutions can be based on a "fair transfer" of Z's tip using the techniques of this invention. It is worthy of note that it seems to be difficult for X to maintain her anonymity from Z without risking Z's tip when Y misbehaves.

Unlinkabiltiy

In the fair exchange protocol described above, the third party Z doesn't learn any useful information about the exchanged keys. However, if the same key K is exchanged more than once through the same Z, then Z can link these exchanges (since f(K) is the same) and possibly determine a set of parties that are accessing the same (unknown) key. Such "linkability problems" are addressed in some electronic commerce protocols by adding random "salt" values. The invention addresses this problem by having X and Y blind the keys that are exchanged. Specifically, X chooses random values rx, ry at the start of the protocol, and computes f(rxKx),f(ryKy). X and Y execute a fair exchange of Kx=rxKx and Ky=ryKy (if X includes rx, ry in the first message flow to Y). X and Y will then have the same guarantees as in the original fair exchange protocol. Since Kx, Ky are drawn from a nearly uniform distribution, common exchanges cannot be linked by Z.

Defeating a Collision Attack

If parties can choose their own secret keys after f is known, then the following attack is possible: Find K, K' such that f(K)=f(K'); encrypt the document with K; publish f(K) for use in exchange protocols with others (e.g., having it appraised as the one-way hash of the valid decryption key for the document); and run the exchange protocol using K'. One defense against this is for f to be determined after K, e.g., as an appropriate function of the encrypted document, provided that it is difficult to determine a K' such that f(K)=f(K') (a stronger requirement than one-wayness, but a weaker requirement than collision-freedom). It is worthy to note that although the fair exchange protocol was specified with the same f for both key-holders, this was not necessary. Another defense is simply to require f to be collision-free; options for constructing such an f were discussed previously. Note that trivial collisions, such as x, −x for the modular squaring implementation, are not useful in this attack, since it is easy for the recipient to try to decrypt with both the received key and the colliding key.

The Hash Function

The function h should be "like a random oracle". In particular, $h(f(Y1)\|f(Kx)\|f(Ky)\|X2)$ should not leak information about X2, or else a cheating Y might learn Kx after Step 1. If X has a signing key and Z knows the corresponding verifying key, and if we did not care about the anonymity of X, then $h(f(Y1)\|f(Kx)\|f(Ky)\|X2)$ could be replaced by the signature of X on $f(y1)\|f(Kx)\|f(Ky)$. Then Step 5 would be modified so that Z gives Y2 to anyone that demonstrates she knows the signing key of X.

Fair Exchange in Micropayment Schemes

The fair exchange protocol of the present invention can be easily integrated with payment schemes in which payment is made by the customer revealing the input that produces a known output from a one-way function, such as with various schemes using electronic coins. This allows for fair purchase of a digital document with an electronic coin, or for the fair exchange of two electronic coins. In such uses, the vendor receiving the electronic coin would not even require an independent "appraisal" of the hash value prior to the exchange, as the prior digital signature of the customer on the hash value (dictated by the electronic coin protocol) suffices to enable the vendor to be compensated by presenting the input that produces that hash value.

Fair Exchange in On-line Payment Schemes

Many electronic payment protocols have an on-line party that authorizes each sale. In these schemes, the customer often pays for goods before knowing they will be received. At best, the customer gets a convincing "receipt" which can be used to complain if the vendor fails to deliver. This receipt is useless, however, if a vendor has disappeared. Given the many "boiler-room operations" in cyberspace, this presents a potentially widespread hazard.

It is often possible to incorporate a fair exchange into the payment protocol using the online authority as the semi-trusted third party. In fact, only "half" of the fair exchange needs to be incorporated into the purchase protocol, so that the key of the vendor (party Y in the fair exchange protocol) gets shared between the customer (party X) and the on-line authority (party Z). This can be done for many electronic payment protocols without increasing the number of flows among the participants. For the purchase of digital goods, this can give the customer a strong alternative to receipt-based protection. Two examples of full protocols are presented as follows.

Fair On-Line Purchase Protocol

The terminology for this embodiment of the invention will be slightly modified to ensure consistency with the literature on payment protocols. A customer C wishes to purchase a secret key Kv initially held by a vendor V, using an electronic payment protocol with an on-line authority A. Assume that all three parties know a one-way function f on the keyspace, and that initially C knows f(Kv).

At the end of the fair purchase, in addition to the security properties required for basic electronic payment, the following will be true:

1. If all three parties are honest, then C learns Kv, and V is credited for the purchase.
2. If C and A are honest, then V will not be credited for the purchase unless C learns Kv, and disruption by V will be detected.
3. If V and A are honest, then C learns nothing useful about Kv unless V is credited for the purchase, and disruption by C will be detected.
4. If C and V are honest, then A learns nothing useful about Kv.

The fair on-line exchange protocol requires that C be able to generate an authenticator $\delta_c(m)$ for a message m such that on-line authority A can authenticate m as having come from C without receiving it directly from C. If C possesses a private key and A knows the corresponding public key, then $\delta_c(m)$ could be C's digital signature on m. If A and C share a PIN that is unique to the customer, and if C possesses a public key for A, then $\delta_c(m)$ could be the encryption of PIN||m under A's public key.

Figure 3:
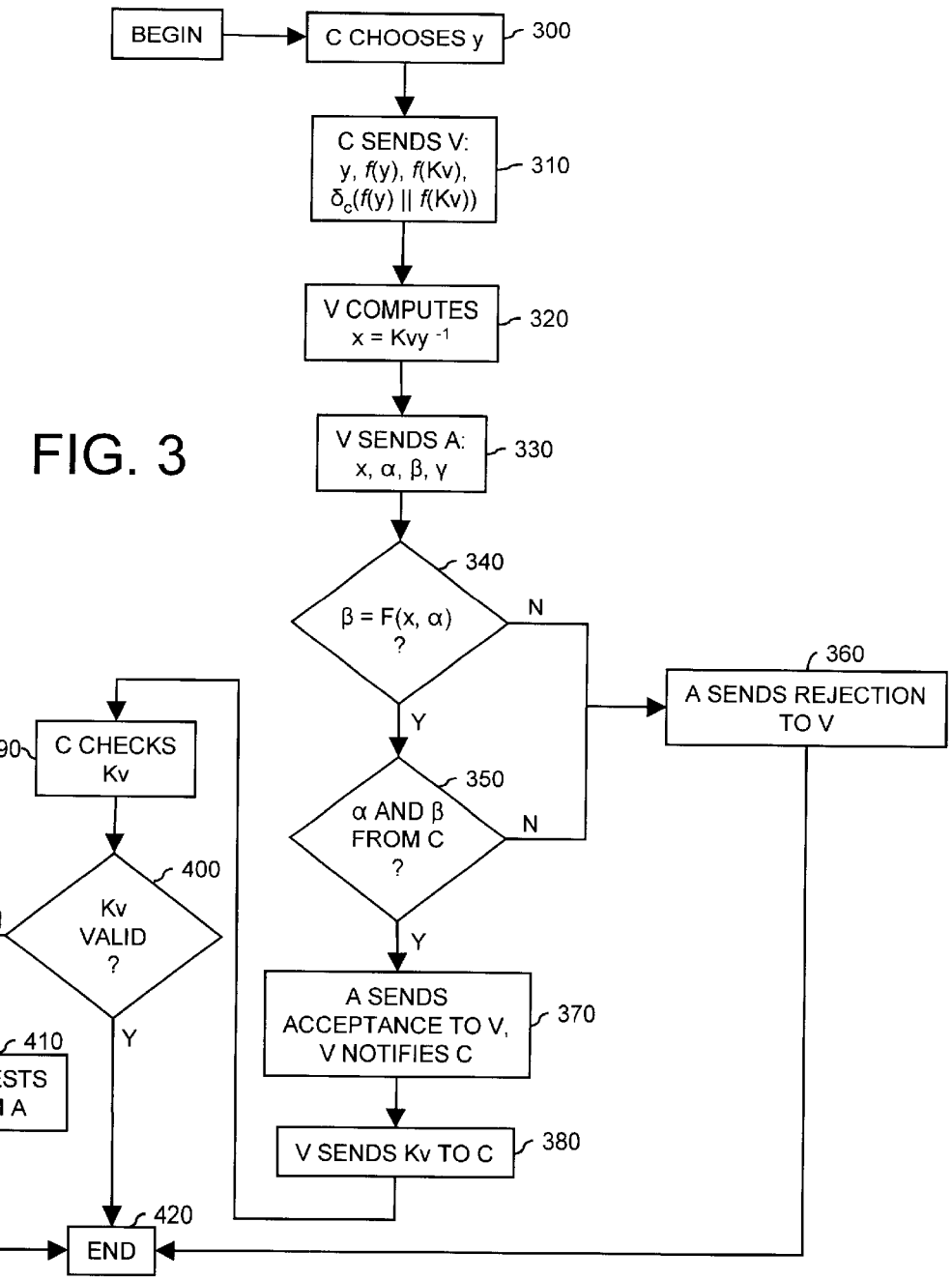
FIG. 3 is a block flow diagram for a fair on-line purchase protocol in accordance with an embodiment of the present invention.

FIG. 3 is a block flow diagram for a fair on-line purchase protocol in accordance with an embodiment of the present invention. The flow for the fair on-line exchange protocol is as follows:

1. At step 300, C chooses a random y (in the domain of f) and sends at step 310
   C→V: y,f(y), f(Kv), $\delta_c(f(y)\|f(Kv))$
2. When V receives
   y, $\alpha$, $\beta$, $\gamma$
   It computes $x=Kvy^{-1}$ at step 320 and sends
   V→A: x, $\alpha$, $\beta$, $\gamma$
   at step 330.
3. At step 340, A Verifies that $\beta=F(x, \alpha)$, and at step 350, that $\alpha$ and $\beta$ came from C (using $\gamma$). If so, A sends an acceptance message to V at step 370 and will subsequently give x to C upon direct request, e.g., after C identifies itself to A using its private key or PIN. Otherwise, A sends a rejection message to V at step 360.
4. V notifies C of A's decision or if V timed out on A at step 370. If A accepted, then V sends Kv to C at step 380.
5. C checks Kv at step 390. If C does not receive Kv (i.e., a value consistent with f(Kv) at step 400) from V, it requests the missing share x from A at step 410, from which it can reconstruct Kv. The process is terminated at step 420.

This can be incorporated into many electronic payment protocols without increasing the number of flows among the participants. When incorporated, A would verify the conditions for ordinary acceptance of a purchase, in addition to the test in Step 3 above.

As with previous embodiments of the present invention, this embodiment allows each party to detect misbehavior by another party. Thus, even if A misbehaves, it will never learn anything useful about Kv, as it never receives x. If V misbehaves, then this will lead to rejection by A unless x is indeed the missing share of the key that the customer wants. In this case, C can claim this missing share x from A. If C misbehaves, and the purchase is rejected, then it learns no relevant information about Kv from either V (who only responds with the standard rejection of the underlying purchase protocol) or A (who will not reveal x after rejection). If C misbehaves and the purchase is accepted, then C will only learn information that it has paid for.

Fair Anonymous On-Line Purchase Protocol

Assume that we have a conventional anonymous on-line cash scheme, such as described in a paper by D. Chaum titled "Security without identification: transaction systems to make big brother obsolete," *Communications of the ACM*, 28(10), October 1985. In the Chaum method, a coin consists of a (blinded) signature by the bank of a random serial number, using a key that denotes the value of the coin. During the purchase protocol, the bank tells the vendor whether coins have been previously spent. Either of the previous methods of authenticating C (public key signature, or encryption of message plus PIN) are inappropriate, since they would violate the anonymity requirement for C. Instead, Chaum's withdrawal protocol can be modified so that C computes the random serial number as the encryption of a random seed s under A's public key: i.e., coin=<Ea(s), $\sigma a(Ea(s))$>, where $\sigma a(Ea(s))$ is A's signature on Ea(s).

Figure 4A:
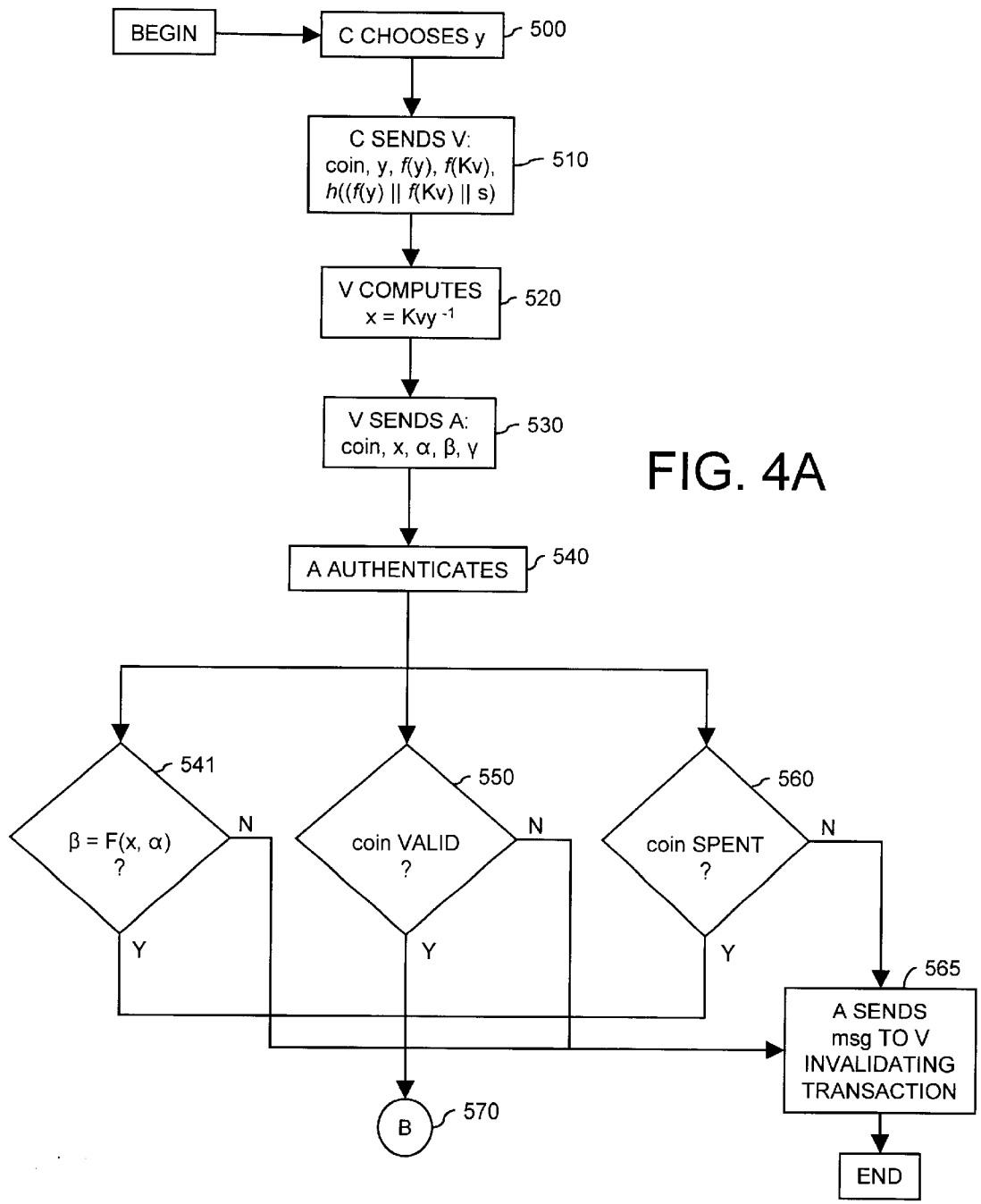
FIG. 4.A is a first block flow diagram for a fair anonymous on-line purchase protocol in accordance with an embodiment of the present invention.
Figure 4B:
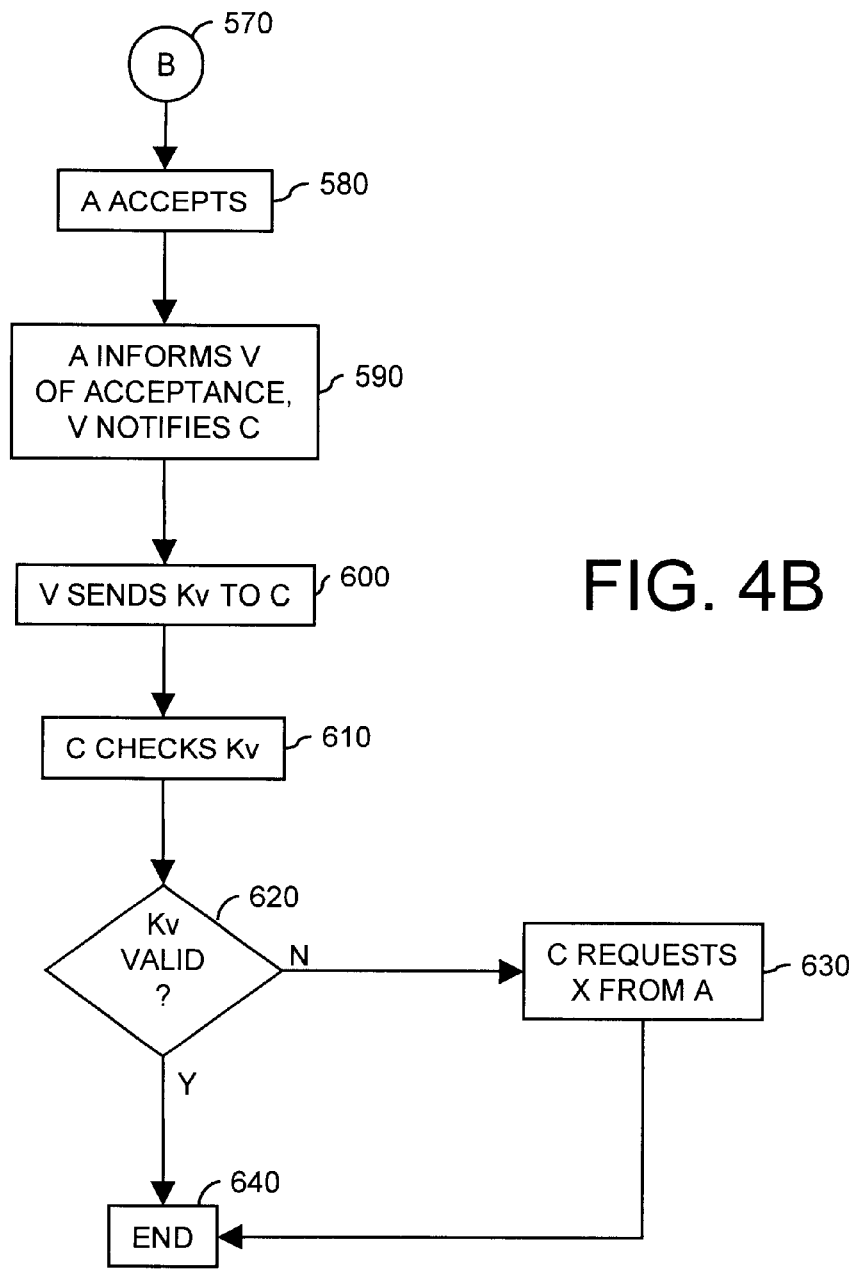

FIGS. 4.A and 4.B are a first block flow diagram and a second block flow diagram, respectively, for a fair anonymous on-line purchase protocol in accordance with an embodiment of the present invention. The flow for the fair anonymous on-line purchase protocol is as follows:

1. At step 500, C chooses a random y (in the domain of f) and sends
   C→V: coin,y, f(y), f(Kv),h(f(y)∥f(Kv)∥s)
   at step 510.
2. When V receives
   coin, y, α,β, γ
   It computes x=Kvy$^{-1}$ at step 520 and sends
   V→A: coin, x, α, β, γ
   at step 530.
3. At step 540, A verifies that β=F(x, α) at step 541, coin=<Ea(s), δa(Ea(s))> where h(α, β, s)=γ at step 550, and coin hasn't been spent yet at step 560. If so, A accepts at step 580 via step 570 (represented by the letter B as shown in FIGS. 4.A and 4.B), and will subsequently give x to anyone that can prove knowledge of s (e.g., by revealing it). If not, A sends a message to V invalidating the transaction at step 565. A informs V of its decision at step 590.
4. V notifies C of A's decision or if V timed out on A at step 590. If A accepted, then V sends Kv to C at step 600.
5. If C does not receive Kv at step 610 (i.e., a value consistent with f(Kv) at step 620) from V, it requests the missing share x from A at step 630, from which it can reconstruct Kv.

As with the other embodiments of the invention, the function h is assumed to be a strong cryptographic hash function ("like a random oracle"). In particular, h(f(y)∥f(K)∥s) should not leak any information about s. Otherwise, a cheating vendor who learns s could get the bank to accept the coin as payment for an arbitrary K'.

Although a preferred embodiment is specifically illustrated and described herein, it will be appreciated that modifications and variations of the present invention are covered by the above teachings and within the purview of the appended claims without departing from the spirit and intended scope of the invention. For example, although functions if and F were shown herein as Fl(v)=V$^2$ mod and 35 and F(A)=(B$^2$xc) mod 35, if can be appreciated that any effective one-way function is usable by the invention. Further, although one embodiment of the invention is illustrated using a two-party transaction, if can be appreciated that multi-party transactions fall within the scope of the invention.

What is claimed is:

1. An apparatus for fairly exchanging documents over a network, comprising:
   means for sharing a first document of a principal X between a principal Y and a third party Z;
   means for sharing a second document of said principal Y between said principal X and said third party Z;
   means for providing a one-way hash of said first document to said principal Y and said third party Z;
   means for providing a one-way hash of said second document to said principal X and said third party Z;
   means for verifying by Z that said sharing of said first and second documents has been performed correctly, without revealing said first or second document to Z, and without comparing shares of said first and second documents to each other;
   means for sending Z's shares of said first and second document to Y and X, respectively, once Z verifies said sharing has been performed correctly;
   means for Y to verify Z's share of said first document; and
   means for X to verify Z's share of said second document.

2. The apparatus described in claim 1, characterized in that said means for sharing use a 2-out-of-2 secret sharing scheme.

3. The apparatus described in claim 2, characterized in that said means for sharing use a one-way function f known to X, Y and Z.

4. The apparatus described in claim 3, characterized in that said means for sharing use a one-way hash h to X, Y and Z.

5. The apparatus described in claim 4, characterized in that said means for verifying use a checksum function F.

6. An apparatus for permitting simultaneous electronic transactions, comprising:
   a first document held by a first principal;
   a second document held by a second principal;
   a one-way hash of said first document in possession of said second principal and a semi-trusted third party, and a one-way hash of said second document in possession of said first principal and said third party;
   means for splitting said first document into section A and section B, and said second document into section C and section D;
   means for exchanging said section A for said section C;
   means for sending sections B and D to said third party;
   means for said first and second principal to produce a checksum of section C and section A, respectively, and sending said checksums to said third party;
   means for verifying by said third party that sections A and B comprise said first document, and that sections C and D comprise said second document;
   means for sending said section B to said second principal and said section D to said first principal once said third party verifies said sharing has been performed correctly; and
   means for authenticating by said first and second principals receipt of said second and first documents, respectively.

7. A method for fairly exchanging documents over a network, comprising:
   sharing a first document of a principal X between a principal Y and a third party Z;
   sharing a second document of said principal Y between said principal X and said third party Z;
   providing a one-way hash of said first document to said principal Y and said third party Z;
   providing a one-way hash of said second document to said principal X and said third party Z;
   verifying by Z that said sharing of said first and second documents has been performed correctly, without revealing said first or second document to Z, and without comparing shares of said first and second documents to each other;
   sending Z's shares of said first and second document to Y and X, respectively, once Z verifies said sharing has been performed correctly;
   verifying by Y that Z's share of said first document is from said first document; and
   verifying by X that Z's share of said second document is from said second document.

8. The method described in claim 7, characterized in that said sharing is accomplished using a 2-out-of-2 secret sharing scheme.

9. The method described in claim 8, characterized in that said sharing is accomplished using a one-way function f known to X, Y and Z.

10. The method described in claim 9, characterized in that said sharing is accomplished using a one-way hash h to X, Y and Z.

11. The method described in claim 10, characterized in that said verifying is accomplished using a checksum function F.

12. A method for simultaneously exchanging a first document held by a first principal for a second document held by a second principal through a semi-trusted third party over a network, comprising the steps of:

providing a one-way hash of said first document to said second principal and said semi-trusted third party, and a one-way hash of said second document to said first principal and said third party;

splitting said first document into section A and section B, and said second document into section C and section D;

exchanging said section A for said section C;

providing sections B and D to said third party;

producing a checksum for section C and section A, and sending said checksums to said third party;

authenticating by said third party using said checksums that sections A and B comprise said first document, and that sections C and D comprise said second documents;

sending said section B to said second principal and said section D to said first principal once said documents match said checksums; and authenticating by said first and second principals that they have correctly received said second and first documents, respectively.

13. A document exchange method, comprising:

splitting a first document into a first share A and a second share B;

sending said first share A to a principal Y;

sending said second share B to a third party Z;

receiving from the principle Y a first share C of a second document;

sending a checksum of said first share C to the third party Z;

receiving from the third party Z a second share D of said second document, and an indication that said first share A and said second share B comprise said first document, and said first share C and said second share D comprise said second document; and assembling the second document from said first share C and said second share D.

14. A document exchange method, comprising:

receiving from a principle X a first share A of a first document;

receiving from a principle Y a first share C of a second document;

receiving from the principal X a checksum of a second share D of said second document after the principle Y sends said second share D to the principle X;

receiving from the principal Y a checksum of a second share B of said first document after the principle X sends said second share B to the principle Y;

verifying that said first share A and said second share B of said first document comprise said first document, and that said first share C and said second share D of said second document comprise said second document; and sending said first share A to the principle Y and sending said first share C to the principle X, once said verifying has been performed correctly.

* * * * *